United States Patent
Muraki et al.

(10) Patent No.: US 7,058,473 B2
(45) Date of Patent: Jun. 6, 2006

(54) METHOD AND DEVICE FOR GENERATION OF MACHINING PROGRAM

(75) Inventors: Toshiyuki Muraki, Aichi pref. (JP); Akira Iseki, Aichi pref. (JP)

(73) Assignee: Yamazaki Mazak Corporation, Aichi Pre. (JP)

( * ) Notice: Subject to any disclaimer, the term of this patent is extended or adjusted under 35 U.S.C. 154(b) by 0 days.

(21) Appl. No.: 11/086,824

(22) Filed: Mar. 21, 2005

(65) Prior Publication Data
US 2005/0222706 A1 Oct. 6, 2005

(30) Foreign Application Priority Data
Mar. 31, 2004 (JP) .............................. 2004-103537

(51) Int. Cl.
*G06F 19/00* (2006.01)

(52) U.S. Cl. .................... 700/190; 700/86; 700/159; 700/186

(58) Field of Classification Search ............... 700/159, 700/160, 173, 175, 179, 182, 184, 186, 187, 700/190, 86, 180
See application file for complete search history.

(56) References Cited

U.S. PATENT DOCUMENTS
5,351,196 A * 9/1994 Sowar et al. ................ 700/190
5,815,400 A * 9/1998 Hirai et al. .................. 700/173
6,772,039 B1 * 8/2004 Kakino et al. ................. 700/86

FOREIGN PATENT DOCUMENTS
JP 58-046409 3/1983

* cited by examiner

*Primary Examiner*—Leo Picard
*Assistant Examiner*—Charles Kasenge
(74) *Attorney, Agent, or Firm*—Sheridan Ross P.C.

(57) ABSTRACT

A method for generating a machining program includes inputting a coordinate value and a machining dimension of a portion to be machined with respect to the axis Z for forming a pair of restricting surfaces. The method includes determining the unit machining shape based on the inputted coordinate value and machining dimension and determining a tool in accordance with the determined unit machining shape. The method includes inputting data about cross-sectional shapes of the portion to be machined and a portion resulting from cutting; generating a machining path; and generating the machining program based on the generated machining path and the determined tool. Therefore, a machining program for forming a cut resulting portion eccentrically projecting is generated in an interactive manner.

14 Claims, 13 Drawing Sheets

| UNO | Material | Outer Diameter | Inner Diameter | Material Length | Material End Surface | Rotational Speed |
|---|---|---|---|---|---|---|
| 0 | | | | | | |

Fig. 5

| UNO | Unit | Depth | Allowance R | Bottom | Wall | Finishing Allowance |
|---|---|---|---|---|---|---|
| XX | End Mill Shaft | 50 | 25 | 3 | 3 | 0.5 |

K →

| SNO | Tool | Nominal Diameter | Approach X | Approach Y | Method | Depth of Cut Z | Depth of Cut R | Circumferential Speed | Feed |
|---|---|---|---|---|---|---|---|---|---|
| R1 | End Mill | 25A | ? | ? | CW | 5 | ◆ | 80 | 2.0 |
| F1 | End Mill | 25B | ? | ? | CW | ◆ | ◆ | 100 | 1.0 |

Ka →

| FIG | PTN | P1X/CX | P1Y/CY | P3X/R | P3Y |
|---|---|---|---|---|---|
| 1 | Circle | 0 | 0 | 70 | ◆ |
| 2 | Circle | 20 | 0 | 30 | ◆ |

|   | FIG1 | PTN | PIX/CX | PIY/CY | P3X/R | P3Y |
|---|---|---|---|---|---|---|
| K→ | 1 | Circle | 0 | 0 | 70 | ◆ |

|   | FIG2 | PTN | PIX/CX | PIY/CY | P3X/R | P3Y |
|---|---|---|---|---|---|---|
|   | 1 | Straight Line | −10 | 0 | ◆ | ◆ |
|   | 2 | Straight Line | −50 | 20 | ◆ | ◆ |
|   | 3 | Straight Line | −50 | −20 | ◆ | ◆ |

METHOD AND DEVICE FOR GENERATION OF MACHINING PROGRAM

BACKGROUND OF THE INVENTION

The present invention relates to methods and devices for generating a machining program.

Conventionally, a control device called an interactive NC device is known, as described in Japanese Examined Patent Publication No. 3-13023. The control device refers to a database in correspondence with a machining process designated by a machining program and thus automatically generates control instructions for a machine tool. More specifically, the control device acquires a process sequence, a target position, a final product shape and the like by means of the control program. The device then refers to the information about a tool, a tool pattern, and cutting conditions pre-registered in the database. In this manner, the control device automatically generates control instructions about axes X, Y, and Z and a main shaft configuring the machine tool, an auto tool changer (ATC), and coolant. Accordingly, this control device makes it possible to generate a machining program easily by simplifying the content of the program, which also simplifies the work of the program generator (the operator).

However, the conventional interactive NC device is incapable of generating a machining program for forming, for example, an eccentric pin of a crankshaft, which is a cut resulting portion projecting eccentrically between a pair of opposing surfaces and having a cross-sectional area smaller than the cross-sectional area of each of the opposing surfaces.

If the machining program for forming the eccentric pin of the crankshaft is generated using the EIA/ISO code, such generation of the program requires a relatively long time. Further, an experienced operator is needed for producing a tool path improving the machining efficiency or accuracy. Also, if an EIA program is generated using CAM, the operation requires work of an experienced operator consuming a relatively long time. In addition, a CAM adapted to a multitasking lathe is also necessary, which increases the costs.

SUMMARY OF THE INVENTION

Accordingly, it is an objective of the present invention to provide a method and a device for generating a machining program for forming a cut resulting portion eccentrically projecting between a pair of opposing surfaces of a machining object and having a cross-sectional area smaller than the cross-sectional area of each of the opposing surfaces, in an interactive manner and with reference to a shape indicated by a drawing.

To achieve the above-mentioned objective, the present invention provides a method for generating a machining program for subjecting a machining object to machining such that the machining object obtains a final product shape. The machining is classified into a plurality of machining modes in correspondence with the final product shape. Each of the machining modes is divided into a plurality of machining units. A unit machining shape is formed in correspondence with each of the machining units. The final product shape is obtained by forming a plurality of unit machining shapes. An axis Z is defined in the machining object. The method includes inputting a coordinate value and a machining dimension of a portion to be machined of the machining object with respect to the axis Z for forming a pair of restricting surfaces crossing the axis Z in the portion to be machined. The method includes determining the unit machining shape based on the inputted coordinate value and machining dimension and determining a tool in accordance with the machining unit associated with the determined unit machining shape. The method includes inputting data about a cross-sectional shape of the portion to be machined crossing the axis Z and data about a cross-sectional shape of a portion resulting from cutting of the portion to be machined; generating a machining path in correspondence with the data about the cross-sectional shapes and the determined tool; and generating the machining program based on the generated machining path and the determined tool.

Further, the present invention provides a device for generating a machining program. The device includes a numerical input portion for inputting a coordinate value and a machining dimension of a portion to be machined of the machining object with respect to an axis Z crossing a restricting surface for forming a pair of restricting surfaces in the portion to be machined. A tool determining portion determines the unit machining shape based on the inputted coordinate value and the machining dimension and determines the tool in accordance with the machining unit associated with the determined unit machining shape. The device includes a shape input portion for inputting data about a cross-sectional shape of the portion to be machined and data about a cross-sectional shape of a portion resulting from cutting of the portion to be machined. The device includes a generating portion for generating a machining path in correspondence with the data about the cross-sectional shapes and the determined tool, wherein the machining program is generated based on the generated machining path and the determined tool.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a block diagram showing the whole system of a machine tool S which the device of FIG. 1 is applied to;

FIG. 5 is a view explaining a display region indicating a unit data line of an end mill shaft machining unit displayed on the display of FIG. 1;

DETAILED DESCRIPTION OF THE PREFERRED EMBODIMENTS

Figure 1:
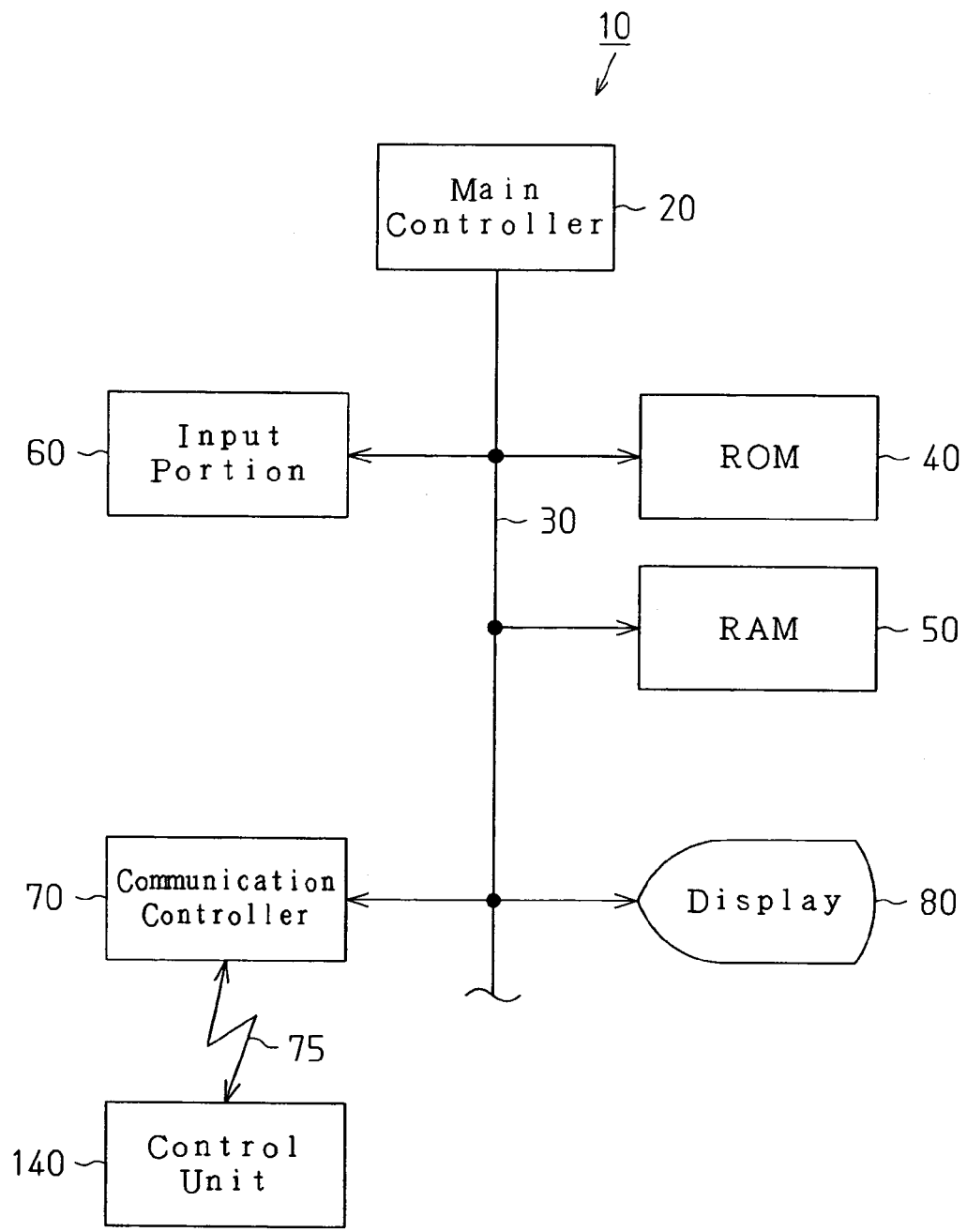
FIG. 1 is a system block diagram showing an example of a machining program generation device 10 according to a first embodiment of the present invention.

FIG. 1 is a system block diagram showing an example of a machining program generation device according to a first embodiment of the present invention.

Figure 2:
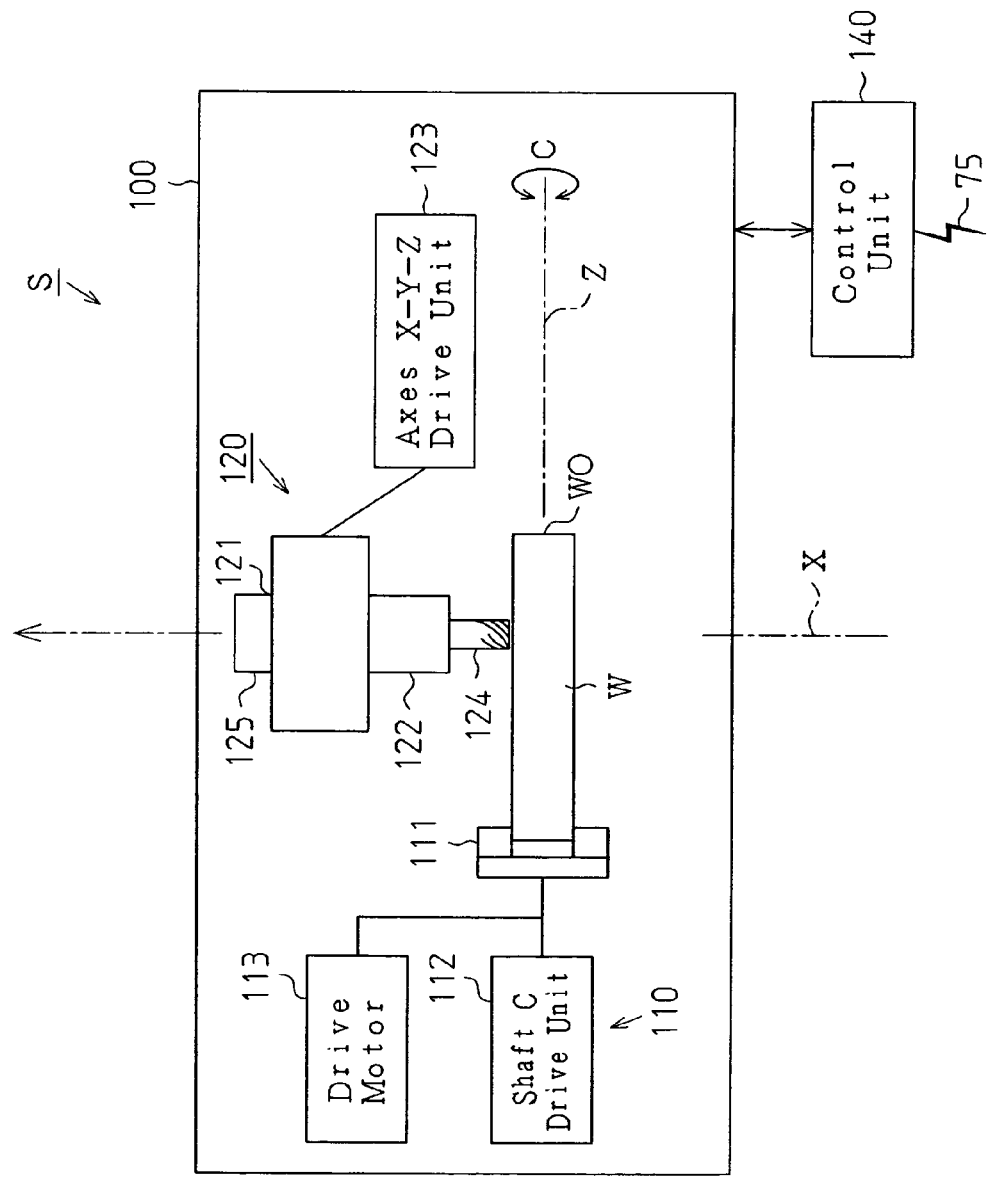

The device 10 includes a main controller 20, which is formed by a CPU. An ROM 40 and an RAM 50, each of which is a memory element, are connected to the main controller 20 through a bus line 30. Also, an input portion 60 formed by a keyboard, a communication controller 70, and a display 80 serving as a display portion are connected to the main controller 20 through the bus line 30. A controller 140 of a machine tool S shown in FIG. 2 is connected to the communication controller 70 through a communication cable 75. The ROM 40 stores a program for generating a machining program.

The input portion 60 functions as a numerical input portion, a shape input portion, a cutting condition basic information input portion, and a cutting condition input portion. The main controller 20 functions as a generating portion, a tool determining portion, a program generating portion, and a cutting condition generating portion.

For enabling the machine tool S of FIG. 2 to machine a workpiece serving as a machining object, necessary program data is inputted to the input portion 60 of the device 10, which is configured as above-described. The device 10 is thus allowed to generate a machining program. In correspondence with the machining program, the main controller 20 controls the machine tool S of FIG. 2. More specifically, the main controller 20 controls various motor circuits of the machine tool S, which is a control object of the main controller 20.

Figures 3, 4:
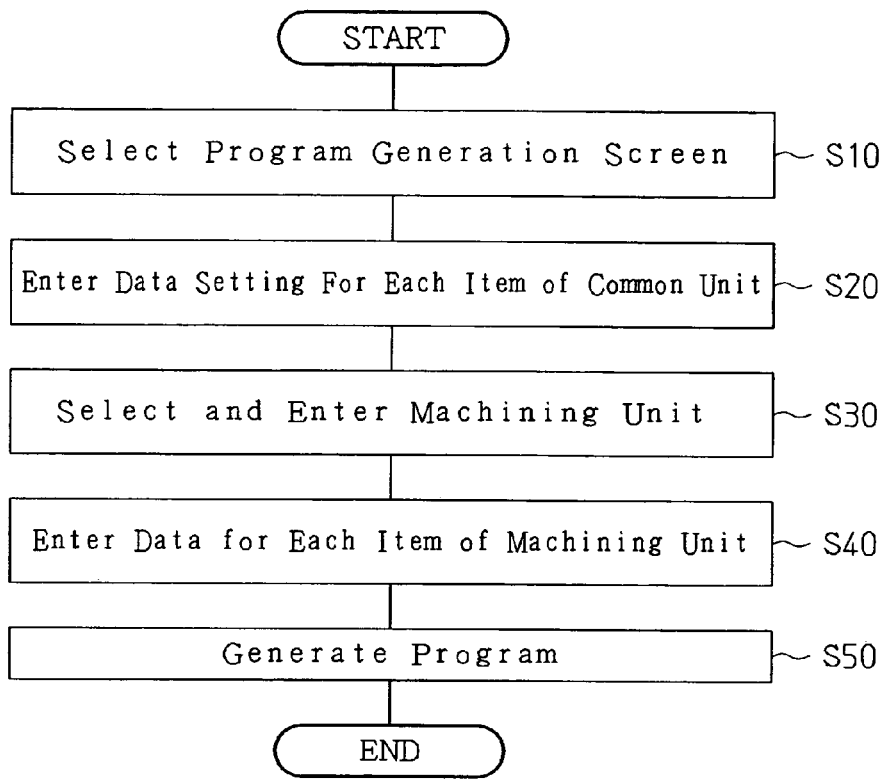
FIG. 3 is a flowchart indicating a program generation procedure executed by the device of FIG. 1.
FIG. 4 is a view explaining a display region indicating a unit data line of a common unit displayed on a display of FIG. 1.

Generation of a program by the device 10 will now be described with reference to FIG. 3. FIG. 3 is a flowchart indicating a program generation procedure. More specifically, the following explains about generation of a machining program for forming an eccentric pin of a crankshaft.

First, through operator manipulation of the input portion 60, the main controller 20 reads out the function information (hereinafter, referred to as a "menu") from the ROM 40 and enables the display 80 to display the information. The input portion 60 includes a plurality of menu keys (not shown). The menu keys corresponding to the displayed menu are then depressed depending on operation purposes (in step S10). In the first embodiment, the menu key corresponding to a program generation screen is depressed, thus enabling the main controller 20 to display the program generation screen on the display 80. The program generation screen has a display region displaying various items including a common unit and a machining unit.

(Common Unit)

With reference to FIG. 4, a unit data line for the common unit displays input items including "UNO. (unit number)", "material", "outer diameter", "inner diameter", "material length", "material end surface", and "rotational speed". The common unit is a leading unit of the program and, in the illustrated embodiment, the unit number is "0". In step S20, necessary information or numerals are entered in correspondence with the displayed items including "material", "outer diameter", "inner diameter", "material length", and "rotation speed" using the corresponding enter or numeric keys provided in the input portion 60. The data entry is achieved by a known method, which explanation is omitted herein. In the illustrated embodiment, since the workpiece corresponds to a rod material, information about the "material", "outer diameter", and "material length" of the rod material are entered. The entered information and numerals are referred to as cutting condition basic information, when some of the cutting conditions, which will be later discussed, are to be automatically determined (computed). The automatic determination also requires the use of a map defined depending on the type of material. The map corresponds to cutting condition generation information and is stored in the ROM 40.

(Machining Unit)

Figure 6:
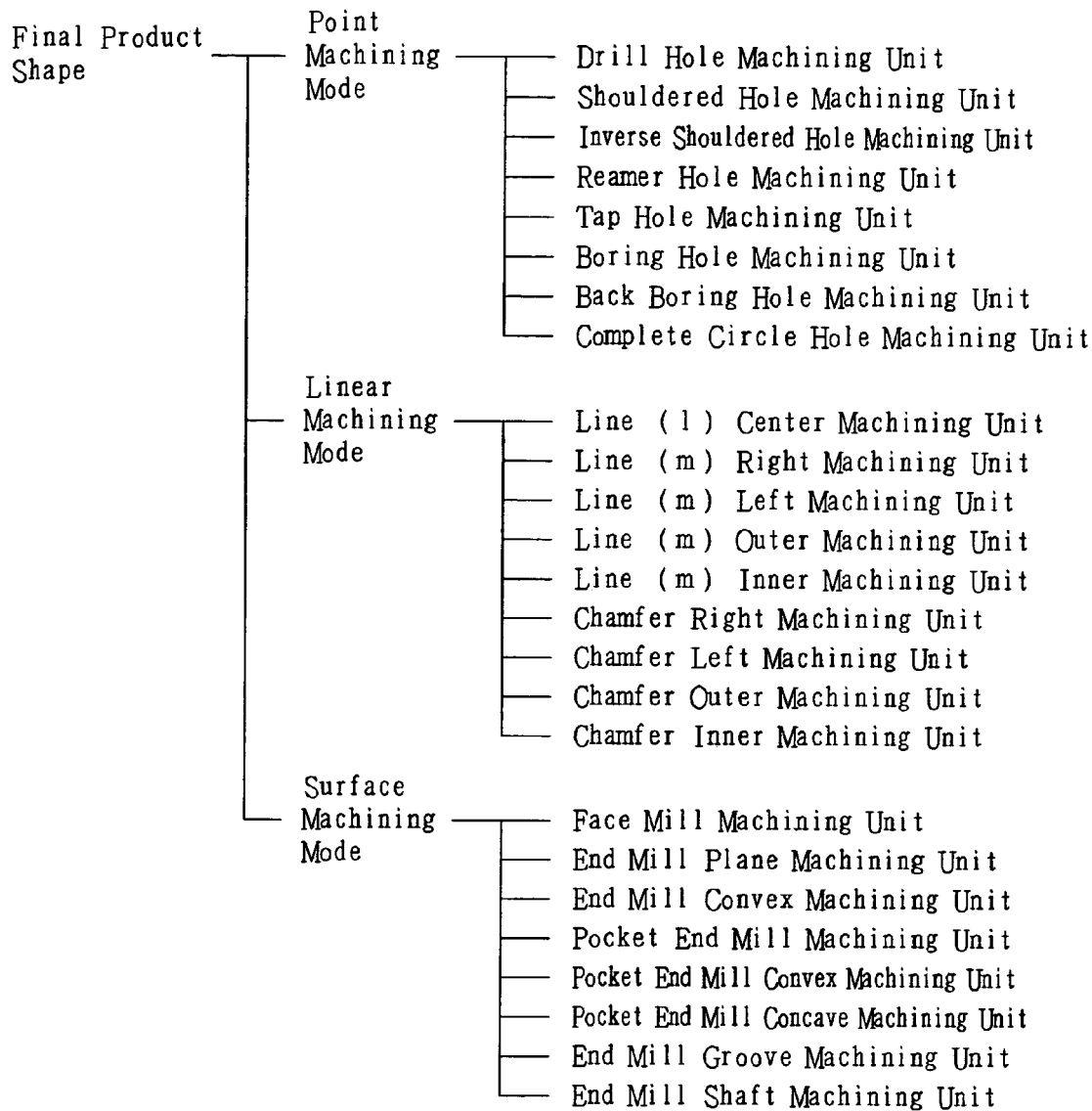
FIG. 6 is a chart classifying machining of a machining object by the machine tool of FIG. 2.

The machining unit will be explained briefly. For example, the types of machining are classified depending on the corresponding drawings, which illustrate the shape of a final product. Referring to FIG. 6, the types of machining, or the shapes of the final product, are classified into a certain number of machining shapes (machining modes). Each of the machining shapes (the machining modes) is generally categorized as a point machining mode using a drill or the like, a linear machining mode using an end mill or the like, or a surface machining mode using a face mill or the like. In accordance with the corresponding machining mode, the machining shapes (the machining modes) are classified into a plurality of machining units. The machining units correspond to unit machining shapes of the workpiece portion machined with a tool such as a drill, end mill, and a face mill. In other words, as illustrated in FIG. 6, the types of machining are classified in a hierarchical manner from the final product shapes to the machining modes and then to the machining units. Regarding the machining units, the machining units other than the "end mill shaft machining unit", which is viewed at the lowermost position of FIG. 6 in correspondence with "(3) surface machining mode", are known in accordance with the aforementioned patent publication and detailed explanation of these machining units are not included in the following description. Data corresponding to the machining units of FIG. 6 is pre-stored in the ROM 40.

With reference to the flowchart of FIG. 3, after the entry of the common unit is completed (in step S20), a unit data line for the machining unit is displayed by the display 80 through manipulation of corresponding menu keys (in step S30), as indicated by the flowchart of FIG. 3.

In the illustrated embodiment, the menu key corresponding to the "end mill shaft machining unit", or machining of a rod material with an end mill, is selected. This enables the main controller 20 to display the unit data line for the end mill shaft machining unit (the uppermost section of FIG. 5), a data line for a tool sequence K associated with the end mill shaft machining unit (the intermediate section of FIG. 5), and a data line for a shape sequence associated with the end mill shaft machining unit (the lowermost section of FIG. 5).

In step S40, information such as data about the end mill shaft machining unit is entered, as will be explained in detail in the following.

(Data Line for End Mill Shaft Machining Unit)

As indicated in the uppermost section of FIG. 5, the displayed unit data line for the end mill shaft machining unit includes input items such as "UNO. (unit number)", "unit (title)", "depth", "allowance R", "bottom", "wall", and "finishing allowance" are entered.

In correspondence with the "UNO.", a numeral sequential to that of the common unit is entered by manipulating the corresponding numeric keys. For entering information, the display 80 displays a cursor. The cursor is moved to a certain input item through operation of a cursor key provided in the input portion 60. Necessary information is entered through the input portion 60 by manipulating a key or keys corresponding to the input item at which the cursor is located.

In correspondence with the "unit (title)", the unit title is entered. The unit title is selected by means of a menu key provided in the input portion 60. In the illustrated embodiment, the "end mill shaft" is selected as the "unit (title)". Numerical data is entered in correspondence with the items including "depth", "allowance R", "bottom", "wall", and "finishing allowance" using numeric keys.

Figure 7:
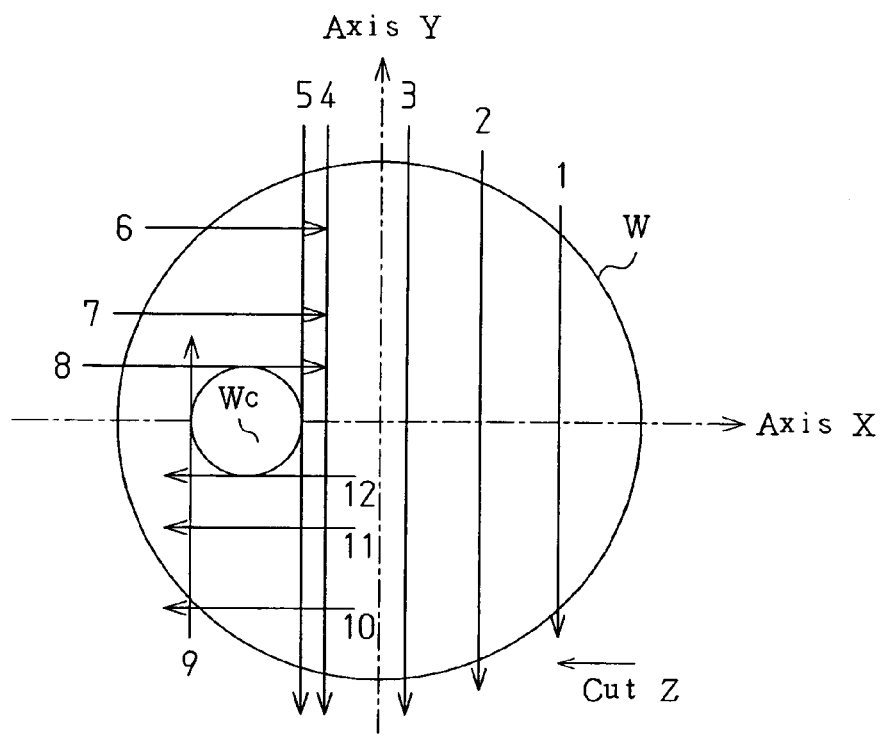
FIG. 7 is a view explaining a machining path of the machine tool of FIG. 2.
Figure 8:
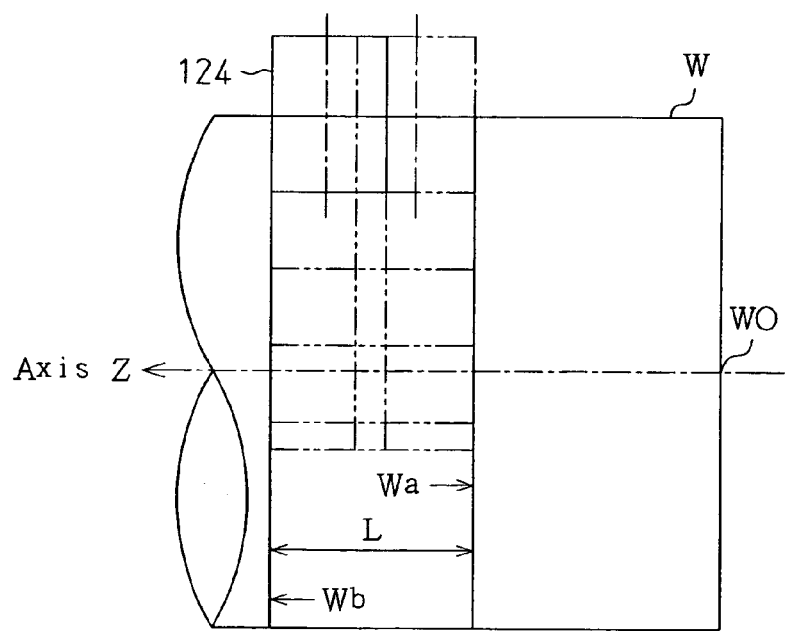
FIG. 8 is a view schematically showing a workpiece of FIG. 7.

The workpiece W includes a pair of opposing, restricting surfaces Wa, Wb. Each of the restricting surfaces Wa, Eb corresponds to a machining surface of the workpiece W. With reference to FIGS. 2, 7, and 8, the machine tool S defines axes X-Y-Z in the machining object, or the workpiece W. The restricting surfaces Wa, Wb extend parallel with the plane XY and perpendicular to the axis Z.

The "depth" indicated in FIG. 5 is an interval between a base point WO of the workpiece W and the restricting surface Wa. In other words, the "depth" corresponds to a coordinate value of a portion to be machined of the object (the workpiece W) in the direction along the axis Z. The portion to be machined corresponds to a portion of the workpiece W at which the restricting surfaces Wa, Wb are formed.

In the illustrated embodiment, the workpiece base point WO corresponds to the position at which the axis of the workpiece W (which is coaxial with the shaft C of FIG. 2) crosses an end surface of the workpiece W in the direction along the axis Z, as shown in FIG. 8. An end surface of the workpiece W including the base point WO is opposed to an end surface of the workpiece W held by a chuck 111, as illustrated in FIG. 2. When the workpiece W is cut along the plane XY by an end mill, a pair of restricting surfaces Wa, Wb are formed. The restricting surface Wa is located closer to the workpiece base point WO.

The "allowance R" of FIG. 5 corresponds to a cut dimension L defined from the restricting surface Wa of the workpiece W in the direction along the axis Z (see FIG. 8). In FIG. 5, the numerals corresponding to the "bottom" and the "wall" indicate the degree of roughness of the machining surface of the workpiece W. The numerals entered as "depth" and "finishing allowance" are indicated by millimeters. The "bottom" indicates a machining surface of the workpiece W cut by a longitudinal distal surface of the end mill. The "wall" corresponds to the machining surface of the workpiece W cut by a longitudinal side surface of the end mill.

(Data Line for Tool Sequence K)

In the intermediate portion of FIG. 5, the "data line for the tool sequence K" may be displayed in a plurality of numbers depending on the type of machining using a tool. In each of the "data lines for the tool sequence K" is associated with the end mill shaft machining unit. In the illustrated embodiment, the machining of the workpiece W includes two types of operations, which are rough machining and finishing. Two data lines are thus displayed as arranged one above the other. That is, the data lines for the tool sequence K is associated with the type of the tool used in the machining unit. The tool sequence K of FIG. 5 is associated with the end mill shaft machining unit and stored in the ROM 40. Therefore, when the menu key corresponding to the end mill shaft machining unit is manipulated, the tool sequence K is read out from the ROM 40 and the tool to be used is automatically developed (determined). In accordance with the end mill machining unit, a rod material is machined with an end mill.

As indicated in the intermediate section of FIG. 5, each of the data lines for the tool sequence K includes input items such as "SNO. (tool sequence number)", "tool (title)", "nominal diameter", "approach X", "approach Y", "method", "depth of cut Z", "circumferential speed", and "feed". In correspondence with the item "SNO.", a code and numeral sequential to those of the machining unit is entered through manipulation of code or numeric keys provided in the input portion 60.

In the illustrated embodiment, "R1" indicates the tool sequence K for rough machining. In correspondence with the item "tool (title)", the title of the tool is entered by selectively operating a corresponding menu key. In correspondence with the item "nominal diameter", a code is entered by selectively operating a corresponding menu key.

The "approach X" and "approach Y" respectively correspond to the coordinate X and coordinate Y of an approach point on the plane XY. The approach point corresponds to a point intermediate between a non-illustrated tool replacement position and a machining start position (a machining start point) for the tool. In operation, the tool is moved from the tool replacement position and passes the approach point for approaching the workpiece W, finally reaching the machining start point. In the illustrated embodiment, if automatic setting is selected through manipulation of the corresponding key, data about "approach X" and "approach Y" are automatically set. In other words, such data is automatically computed by means of a computation program with reference to the other data entry (corresponding to the "material", "outer diameter", and "material length" of FIG. 4). The mark "?" indicates that data about the corresponding item has been automatically set.

In correspondence with the "method" in the intermediate portion of FIG. 5, the cut direction of the tool with respect to the workpiece W is entered through selective operation of a corresponding menu key. In FIG. 5, "CW" indicates that the cut direction of the tool is clockwise. In correspondence with the "depth of cut Z", the cut amount per cut of the tool is entered by means of numeric keys. In correspondence with the "circumferential speed", the circumferential speed of the tool is entered as numerical data by means of numeric keys. In correspondence with the "feed", the feed amount of the tool is entered as numerical data by means of numeric keys. In the illustrated embodiment, the codes ♦ are indicated in correspondence with the "depth of cut R" of the data line (R1) for the rough machining and the "depth of cut Z" and "depth of cut R" of the data line (F1) for the finishing. The code ♦ indicates that data about the corresponding item is automatically computed. In other words, the items indicated by this code are automatically set using a predetermined equation or map, with reference to the other data entered through the input portion 60.

More specifically, the "method", "depth of cut Z", "depth of cut R", "circumferential speed", and "feed" are cutting conditions. The "depth of cut R" of the data line for the rough machining is calculated (automatically computed) based on the data entered in correspondence with the common unit, including the "material", "outer diameter", and "material length" of the rod material (the workpiece W). The "depth of cut Z" and "depth of cut R" of the data line for the finishing are calculated (automatically computed) based on the aforementioned data entered in correspondence with the common unit.

(Data Line for Shape Sequence Ka)

The number of data lines for the shape sequence Ka, which are viewed in the lowermost section of FIG. 5, may be changed as needed. More specifically, an additional data line is inserted through manipulation of an insert key provided in the menu keys. In contrast, by manipulating a delete key, a corresponding data line is deleted.

In the illustrated embodiment, the displayed data lines for the shape sequence Ka include a data line for a machining object and a data line for a cut object, which is displayed below the data line for the machining object. The data line for the machining object is related to the cross-sectional shape of the portion to be machined of the workpiece W along the plane XY. The data line for the cut object is related to the cross-sectional shape of a portion resulting from cutting of the portion to be machined (a resulting portion), or a cut resulting portion, along the plane XY.

Each of the data lines for Ka, which are viewed in the lowermost section of FIG. 5, includes input items such as "FIG", "PTN", "P1X/CX", "P1Y/CY", "P3X/R", and "P3Y". The "FIG" corresponds to data representing an input order of shape data.

In the illustrated embodiment, the data line indicated by "1" of "FIG" corresponds to the data line for the machining object. The data line indicated by "2" of "FIG" corresponds to the data line for the cut object.

(1. Data Line for Machining Object)

In the data line for the machining object, the "PTN" corresponds to data about the cross-sectional shape of the portion to be machined of the workpiece W along the plane XY. The "P1X/CX" and "P1Y/CY" each correspond to coordinate data about the cross sectional shape of the portion to be machined of the workpiece W along the plane XY. The "P3X/R" and "P3Y" each correspond to numerical data about the cross sectional dimensions of the portion to be machined of the workpiece W along the plane XY.

More specifically, in correspondence with "FIG", a numeral is entered through manipulation of a corresponding numeric key. In correspondence with the "PTN" of the first line, the cross sectional shape of the portion to be machined of the workpiece W along the plane XY is entered through selective manipulation of a corresponding one of the menu keys. Although "circle" is selected in FIG. 5, it is also possible to select a different cross-sectional shape such as "square".

When "circle" is entered in correspondence with "PTN", "P1X/CX" corresponds to the coordinate X of the center of the circle and "P1Y/CY" corresponds to the coordinate Y of the center of the circle. The data is entered as numerical data through manipulation of numeric keys.

If "PTN" corresponds to "square", one of the four corners is defined as the machining start point. In this case, "P1X/CX" corresponds to the coordinate X of the machining start point and "P1Y/CY" corresponds to the coordinate Y of the machining start point. The data is entered as numerical data through manipulation of numeric keys.

Further, in this case, it is necessary to enter the coordinate values of the opposing corner (an opposing corner point) of the machining start point for determining the dimensions of the square. Thus, "P3X/R" corresponds to the coordinate X of the opposing corner point and "P3Y" corresponds to the coordinate Y of the opposing corner point. The data is entered as numerical data through manipulation of numeric keys.

As has been described, a single data line for the machining object is displayed in the illustrated embodiment, as long as the "PTN" corresponds to "circle" or "square". However, the number of the data lines is not restricted to that of the embodiment but may be increased to two, when necessary.

(2. Data Line for Cut Object)

In the data line for the cut object, the "PTN" corresponds to data about the cross-sectional shape of the portion resulting from cutting of the portion to be machined of the workpiece W along the plane XY. The "P1X/CX" and "P1Y/CY" each correspond to coordinate data about the cross sectional shape of the cut resulting portion along the plane XY. The "P3X/R" and "P3Y" each correspond to numerical data about the cross sectional dimensions of the cut resulting portion along the plane XY.

More specifically, in correspondence with "FIG", a numeral is entered through manipulation of a corresponding numeric key. In correspondence with the "PTN", the cross sectional shape of the portion resulting from cutting of the portion to be machined of the workpiece W along the plane XY is entered through selective manipulation of a corresponding one of the menu keys. Although "circle" is selected in FIG. 5, it is also possible to select a different cross-sectional shape such as "square".

When "circle" is entered in correspondence with "PTN", "P1X/CX" corresponds to the coordinate X of the center of the circle and "P1Y/CY" corresponds to the coordinate Y of the center of the circle. The data is entered as numerical data through manipulation of numeric keys.

If "PTN" corresponds to "circle", the radius of the circle is entered in correspondence with "P3X/R" as numerical data through manipulation of numeric keys. In this case, the code ♦ is indicated in correspondence with "P3Y", as shown in FIG. 5, and no entry is performed.

If "PTN" corresponds to "square", one of the four corners is defined as a reference point. Further, for determining the position of the square on the plane XY, it is necessary to enter the coordinate values of the reference point. Thus, in this case, "P1X/CX" corresponds to the coordinate X of the reference point and "P1Y/CY" corresponds to the coordinate Y of the reference point. The data is entered as numerical data through manipulation of numeric keys.

Further, in this case, it is necessary to enter the coordinate values of the opposing corner (an opposing corner point) of the reference point for determining the dimensions of the square.

Accordingly, in this case, "P3X/R" corresponds to the coordinate X of the opposing corner point and "P3Y" corresponds to the coordinate Y of the opposing corner point. The data is entered as numerical data through manipulation of numeric keys.

With reference to the flowchart of FIG. 3, after the data entry corresponding to that of FIG. 5 is completed in step S40, completion of the program data entry is instructed through key manipulation from the input portion 60. In response to the instruction, the main controller 20 generates a machining program in step S50, based on the data entered in steps S20 to S40.

The ROM 40 pre-stores machining path data (machining path generation references) corresponding to the data about the cross-sectional shape of the portion to be machined of the workpiece W along the plane XY and the data about the cross-sectional shape of the portion resulting from cutting of the portion to be machined along the plane XY. The machining path data is defined in association with the portion to be machined, and the tool in operation moves along the machining path. For generating the machining program, the main controller 20 reads out a corresponding machining path from the ROM 40. The path is then corrected through computation based on the numerical data about the cross-sectional dimensions of the workpiece W, "depth" (the coordinate value in the direction along the axis Z), "allowance R" (machining dimension), and the nominal diameter of the tool for rough machining. In this manner, a rough machining path is generated. Likewise, the main controller 20 reads out a corresponding machining path from the ROM 40 and corrects the path through computation based on the numerical data about the cross-sectional dimensions, "depth" (the coordinate value in the direction along the axis Z), "allowance R" (machining dimension), and the nominal diameter of the tool for finishing. A finishing path is thus generated. The ROM 40 corresponds to a memory for machining paths.

The main controller 20 then stores the generated rough machining and finishing paths in the RAM 50. Also, the main controller 20 stores the data entered or automatically computed as indicated by FIGS. 4 or 5 (including data about cutting conditions; hereinafter referred to as "mode data") in the RAM 50. Using the stored mode data and the rough machining and finishing paths, the main controller 20 generates a machining program for controlling various motor circuits of the machine tool S, the control object. Since the method for generating the machining program by classifying the types of machining performed by the machine tool S into the machining units is publicly known, the detailed description of the method will be omitted.

(Machine Tool S)

An example of application of the generated machining program will be explained. The explanation is started by schematic description of the machine tool S, which is controlled in accordance with the machining program. FIG. 2 is a schematic view showing the machine tool S.

The machine tool S includes a frame 100 in which a workpiece holding device 110 serving as a headstock and a rotational tool blade table 120. Although not illustrated, a tool replacement device is also provided in the machine tool S. The machine tool S allows replacement of a tool with respect to a tool holder 122 provided in the rotational tool blade table 120. The workpiece holding device 110 has a chuck 111 and a shaft C drive unit 112. The chuck 111 holds the workpiece W, which is to be machined, in a removable manner. The chuck 111 is rotational about a main shaft of the chuck 111 defined around a predetermined axis Z. The shaft C drive unit C 112 is capable of rotating the chuck 111 about the shaft C corresponding to the axis Z. A drive motor 113 rotates the chuck 111 about the axis Z. The axis Z corresponds to the main shaft.

The rotational tool blade table 120 defines an axis X, an axis Y, and the axis Z with respect to the frame 100. The axes X, Y, and Z extend perpendicular to one another. The blade table 120 includes a body 121 movable within a plane XY, a plane XZ, and a plane YZ. The rotational tool blade table 120 further has axes X-Y-Z drive unit 123 that is capable of moving and positioning the body 121 within the planes XY, XZ, and YZ.

The body 121 has the tool holder 122 and a drive motor 125. The tool holder 122 holds a rough machining end mill 124 serving as a tool or a finishing end mill in a removable manner. The drive motor 125 rotates the end mill 124 through the tool holder 122. The axis Y is defined in the body 121 such that the axis Y crosses the axis X and extends perpendicular to the plane X-Z. The axis Y extends perpendicular to the surface of FIG. 2.

The shaft C drive unit 112, the axes X-Y-Z drive unit 123, the drive motor 113, and the drive motor 125 are electrically connected to a controller 140. The controller 140 is formed by a computer and executes the machining program generated by the main controller 20. The controller 140 controls the shaft C drive unit 112, the axes X-Y-Z drive unit 123, the drive motor 113, and the drive motor 125, in correspondence with various types of control signals received from the main controller 20 through the communication controller 70.

Figure 9:
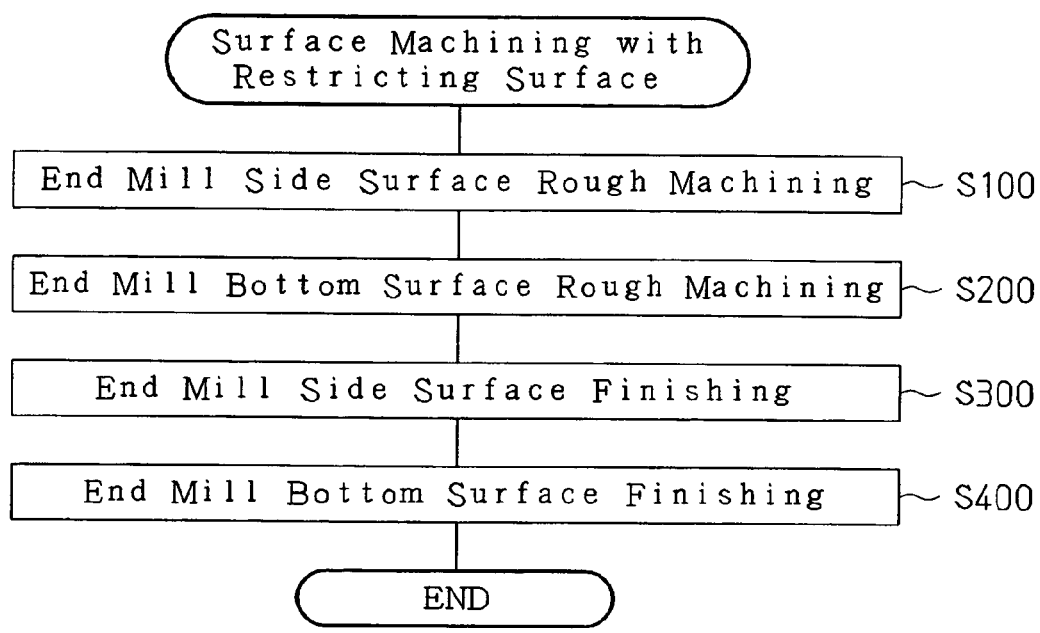
FIG. 9 is a flowchart indicating a machining program (for surface machining including machining of a restricting surface) generated by the program of FIG. 3.

FIG. 9 is a flowchart corresponding to the machining program generated in the above-described manner. The machining program is addressed to surface machining including machining of the restricting surfaces. In the illustrated embodiment, as shown in FIG. 7, each of the rough machining path and the finishing path includes paths numbered 1 through 12. In FIG. 7, the section indicated by Wc corresponds to the portion resulting from cutting of the workpiece W.

Figure 10:
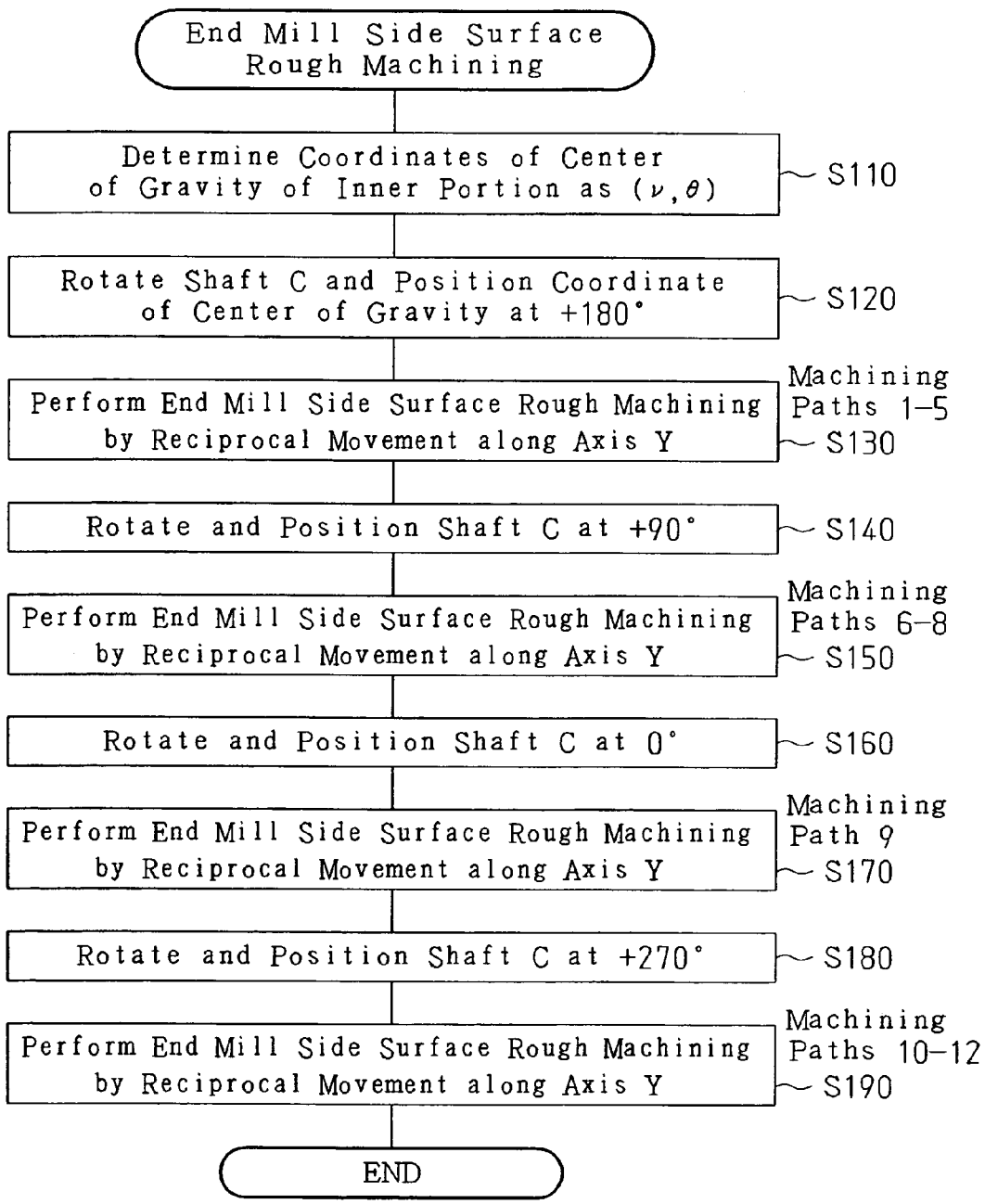
FIG. 10 is a flowchart indicating an end mill side surface rough machining procedure in accordance with the flowchart of FIG. 9.

In execution of the machining program, the main controller 20 first performs rough machining of a side surface of the workpiece W by means of an end mill (end mill side surface rough machining) in step S100. FIG. 10 is a flowchart of the end mill side surface rough machining. In step S110 of FIG. 10, the main controller 20 obtains the coordinates of a center of gravity P. The center of gravity P corresponds to a center of gravity of a cross section (an inner portion) of the portion resulting from cutting of the workpiece W. The coordinates of the center of gravity P are obtained as the polar coordinates $(\gamma, \theta)$ defined in a coordinate system on the plane XY having a base point corresponding to the crossing point between the shaft C and the plane XY. In the illustrated embodiment, it is assumed that the cut resulting portion has a circular cross-sectional shape. Thus, the coordinates of the center of gravity P is computed based on the coordinates X, Y of the center of circle, which are entered in correspondence with "P1X/CX" and "P1Y/CY" of the data line of the shape sequence Ka for the cut object, as viewed in the lowermost section of FIG. 5. At the initial stage, the coordinates X, Y of the center of gravity P (x, y), as well as the polar coordinates $(\gamma, \theta)$, correspond to (20, 0).

Figure 11:
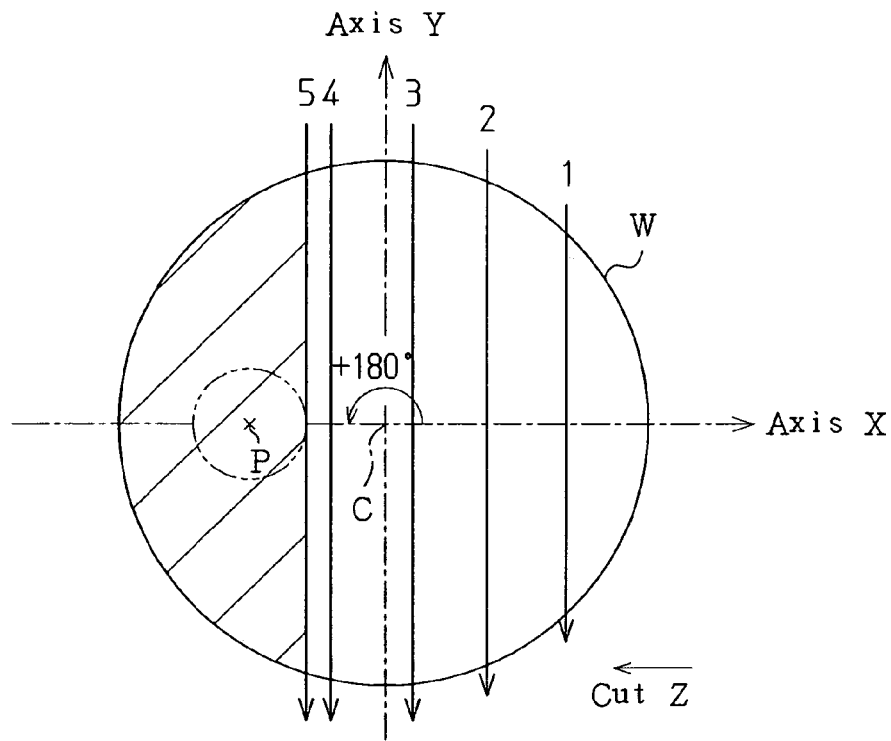
FIG. 11 is a view explaining an angular position of center of gravity P of the workpiece of FIG. 7.

In step S120, the main controller 20 enables the shaft C drive unit 112 to rotate the shaft C such that the center of gravity P is positioned at the point corresponding to +180 degrees (see FIG. 11). The rotational angle of the shaft C is an angle measured counterclockwise from the axis X in FIG. 11. In the state of FIG. 11, the main controller 20 enables the axes X-Y-Z drive unit 123 to reciprocally move the end mill 124 along the axis Y, or, more specifically, the machining paths (1–5) of FIG. 11, in step S130. In this manner, the workpiece W is subjected to the rough machining by the side surface of the end mill 124. After moving the end mill 124 along a certain machining path at a certain position on the axis Z, the main controller 20 moves the end mill 124 along the axis Z by a pre-computed amount. The end mill 124 is then allowed to move along the same machining path. When a necessary cut dimension L with respect to the axis Z is covered by repeating this operation, the main controller 20 switches to a subsequent machining path. For example, after performing the rough machining along the machining path (1), the main controller 20 moves the end mill 124 along the axis Z and allows the end mill 124 to perform the machining along the path (1). In this manner, the rough machining is carried out along the machining path (1), such that the cut dimension L is covered. The main controller 20 then switches to the subsequent path (2) and resumes the rough machining. In FIGS. 11 to 14, the hatched portion indicates a portion yet to be machined.

Figure 12:
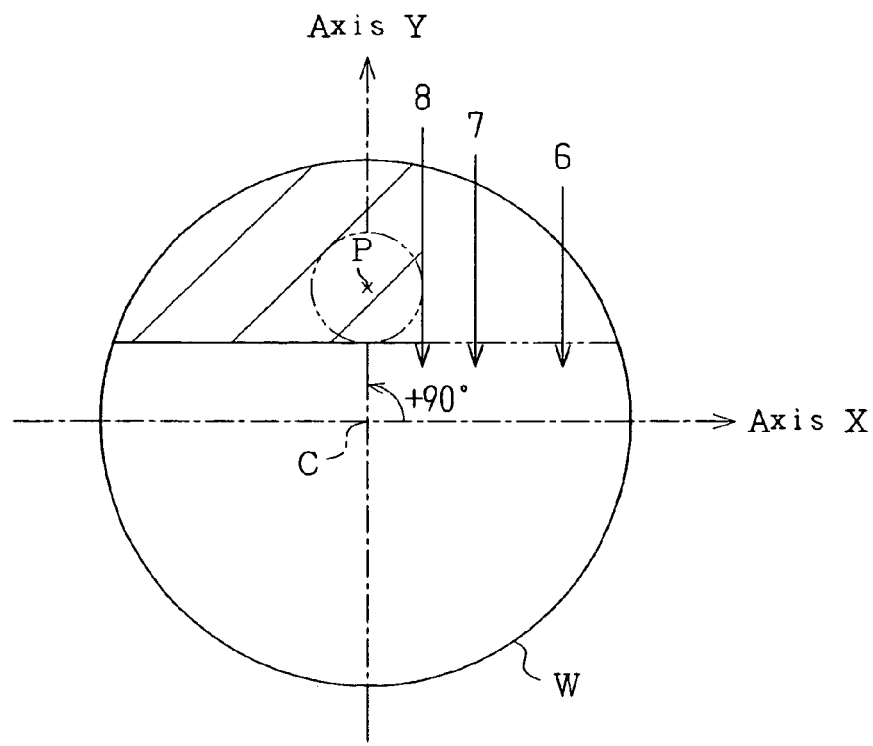
FIG. 12 is a view explaining an angular position of center of gravity P of the workpiece of FIG. 7.

Subsequently, in step S140, the main controller 20 drives the shaft C drive unit 112 to position the center of gravity P at the position corresponding to +90 degrees (see FIG. 12). In the state of FIG. 12, the main controller 20 enables the axes X-Y-Z drive unit 123 to reciprocally move the end mill 124 along the axis Y (the machining paths (6–8) of FIG. 12), in step S150. In this manner, the workpiece W is subjected to the rough machining by the side surface of the end mill 124. As in step S130, the main controller 20 continuously operates along a certain machining path at one position along the axis Z until the cut dimension L is covered. When the cut dimension L is covered along the machining path, the machining is switched to a subsequent machining path.

Figure 13:
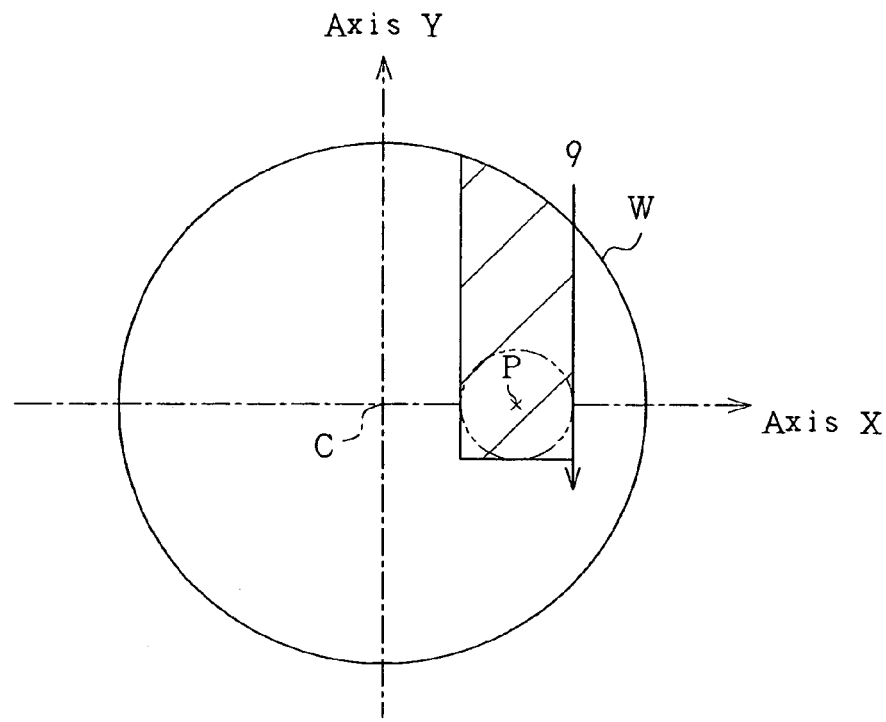
FIG. 13 is a view explaining an angular position of center of gravity P of the workpiece of FIG. 7.

In step S160, the main controller 20 drives the shaft C drive unit 112 to position the center of gravity P at the position corresponding to 0 degrees (see FIG. 13). In the state of FIG. 13, the main controller 20 enables the axes X-Y-Z drive unit 123 to reciprocally move the end mill 124 along the axis Y (the machining path (9) of FIG. 13), in step S170. In this manner, the workpiece W is subjected to the rough machining by the side surface of the end mill 124. As in step S130, the main controller 20 continuously operates along a certain machining path until the cut dimension L is covered. In the first embodiment, since the single machining path (9) is provided in correspondence with step S170, as shown in FIG. 13, the main controller 20 ends the step S170 when the cut dimension L is covered about the machining path (9).

Figure 14:
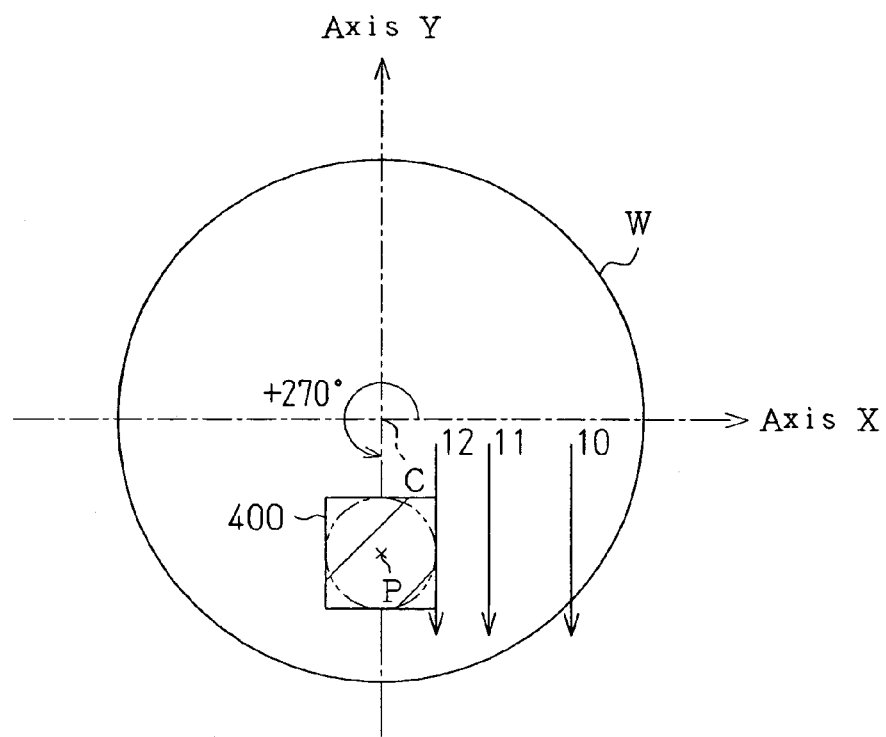
FIG. 14 is a view explaining an angular position of center of gravity P of the workpiece of FIG. 7.

In step S180, the main controller 20 drives the shaft C drive unit 112 to position the center of gravity P at the position corresponding to +270 degrees (see FIG. 14). In the state of FIG. 14, the main controller 20 enables the axes X-Y-Z drive unit 123 to reciprocally move the end mill 124 along the axis Y (the machining paths (10–12) of FIG. 14), in step S190. In this manner, the workpiece W is subjected to the rough machining by the side surface of the end mill 124.

As in step S130, the main controller 20 continuously operates along a certain machining path until the cut dimension L is covered. When the cut dimension L is covered along the machining path, the machining is switched to a subsequent machining path. When the cut dimension L is covered in a final machining path (12) in step S190, the main controller 20 ends the routine.

Subsequently, in step S200, the main controller 20 performs rough machining by the bottom surface of the end mill 124 (end mill bottom surface rough machining). As illustrated in FIG. 14, the portion resulting from cutting of the workpiece W and having a square cross-sectional shape (hereinafter, referred to as "shaft 400") includes four side surfaces. In the end mill bottom surface rough machining, each of the four side surfaces is subjected to the rough machining by the bottom surface of the end mill 124. In this step, the main controller 20 operates the shaft C drive unit 112 such that the angular position of the center of gravity P shifts from position to position at angular intervals of, for example, 22.5 degrees. At each of the positions, the main controller 20 rotates the end mill 124 with respect to the corresponding side surface of the shaft 400. The side surface is thus subjected to the rough machining by the bottom surface of the end mill 124. Although the angular interval is defined, by way of example, as 22.5 degrees, the shaft 400 may be rotated at smaller angular intervals.

In step S300, the end mill 124 held by the tool holder 122 is replaced by a finishing end mill at a non-illustrated tool replacement position. The finishing end mill is then enabled to perform an end mill side surface finishing. More specifically, as shown in FIGS. 11 to 14, the main controller 20 positions the center of gravity P at each of the positions corresponding to +180, +90, 0, and +270 degrees. At each position, the restricting surfaces Wa, Wb are subjected to the finishing along the machining paths of FIG. 7.

In step S400, the main controller 20 performs end mill bottom surface finishing. In the end mill bottom surface finishing, the main controller 20 operates the shaft C drive unit 112 such that the (angular) position of the center of gravity P shifts from position to position at angular intervals of, for example, 22.5 degrees. At each of the positions, the main controller 20 rotates the end mill with respect to the corresponding side surface of the shaft 400. The side surface is thus subjected to the finishing by the bottom surface of the end mill. Although the angular interval is defined, by way of example, as 22.5 degrees, the shaft 400 may be rotated at smaller angular intervals.

As configured as above-described, the machining program generation device 10 has the following advantages.

(1) For forming a pair of restricting surfaces Wa, Wb extending perpendicular to the axis Z in the portion to be machined of the workpiece W, the "depth (the coordinate value along the axis Z)" and "allowance R (machining dimension)" of the portion to be machined are entered numerically in the device 10 of the first embodiment. The device 10 determines the unit machining shape based on the numerical data entry and automatically develops (determines) a tool to be employed in correspondence with the machining unit associated with the determined unit machining shape. Also, the cross-sectional shape of the portion to be machined of the workpiece W and that of the portion Wc resulting from cutting of the portion to be machined are inputted to the device 10. Based on the machining path data (the machining path generation references) pre-stored in the ROM 40 (the memory for machining paths), the device 10 generates a machining path associated with the cross-sectional shapes and the employed tool. Further, in correspondence with the generated machining path and the automatically determined tool, the device 10 generates a machining program.

For achieving such method, the device 10 is provided with the input portion 60 (the numerical input portion and the shape input portion) and the main controller 20 (the generating portion and the tool determining portion). The device 10 functions as a machining program generation device for generating a machining program in correspondence with the generated machining path and the determined tool.

Accordingly, in production of a portion located between a pair of opposing restricting surfaces Wa, Wb and having a cross-sectional area smaller than that of each restricting surface Wa, Wb by cutting a workpiece W, as in the case of a crankshaft, the device 10 enables generation of a machining program based on interaction between the operator and the device 10. The interaction is related to the cross-sectional shape of the portion to be machined of the workpiece W and the cross-sectional shape of the shaft 400.

(2) In the first embodiment, for generating the cutting condition for the rough machining of the workpiece W ("depth of cut R") before the numerical data entry such as "depth" and "allowance R", the device 10 uses the data entered in correspondence with the common unit, such as "material", "outer diameter", and "material length" of the rod material (the cutting condition basic information). For generating the cutting conditions for the finishing of the workpiece W ("depth of cut Z" and "depth of cut R"), the device 10 employs the aforementioned data entered in correspondence with the common unit for the rod material (the cutting condition basic information). Further, based on this data, the device 10 generates the cutting conditions with reference to the map (the cutting condition generation information).

In correspondence with the generated cutting conditions and machining path and the determined tool, the device 10 generates a machining program.

For accomplishing the aforementioned machining program generation method, the input portion 60 functions as the cutting condition basic information input portion and the main controller 20 functions as the cutting condition generating portion, in addition to the functions of the device 10 described in (1). This enables the device 10 to function as a machining program generation device for generating a machining program based on the generated cutting conditions and machining path and the determined tool.

As a result, also in the case in which the cutting conditions are inputted into the device 10, the machining program is generated through interaction between the operator and the device 10 about the cross-sectional shape of the workpiece W.

(3) In the first embodiment, after performing the numerical data entry of "depth" and "allowance R", the cutting condition of the workpiece W ("depth of cut Z" in the data line for the rough machining tool sequence K) is inputted into the device 10. The device 10 generates a machining program based on the inputted cutting condition, the generated machining path, and the determined tool.

For accomplishing the aforementioned machining program generation method, the input portion 60 functions as the cutting condition input portion, in addition to the functions of the machining program generation device 10 of (1). The device 10 thus functions as a machining program generation device for generating a machining program based on the inputted cutting condition, the generated machining path, and the determined tool.

As a result, the machining program is generated also through direct entry of some of the cutting conditions.

Next, a second embodiment of the present invention will be described with reference to FIGS. 3, 9, and 15 to 20. The hardware configuration of the second embodiment is identical to that of the first embodiment. Thus, same or like reference numerals are given to parts of the second embodiment that are the same as or like corresponding parts of the first embodiment. The following description will focus on the difference between the second embodiment and the first embodiment.

In the second embodiment, the machining program generation device 10 generates a machining program in accordance with the flowchart of FIG. 3, as in the first embodiment. However, in correspondence with the machining unit in step S40, the data entry for the shape sequence Ka is performed in a different manner from the first embodiment.

Figures 15, 16:
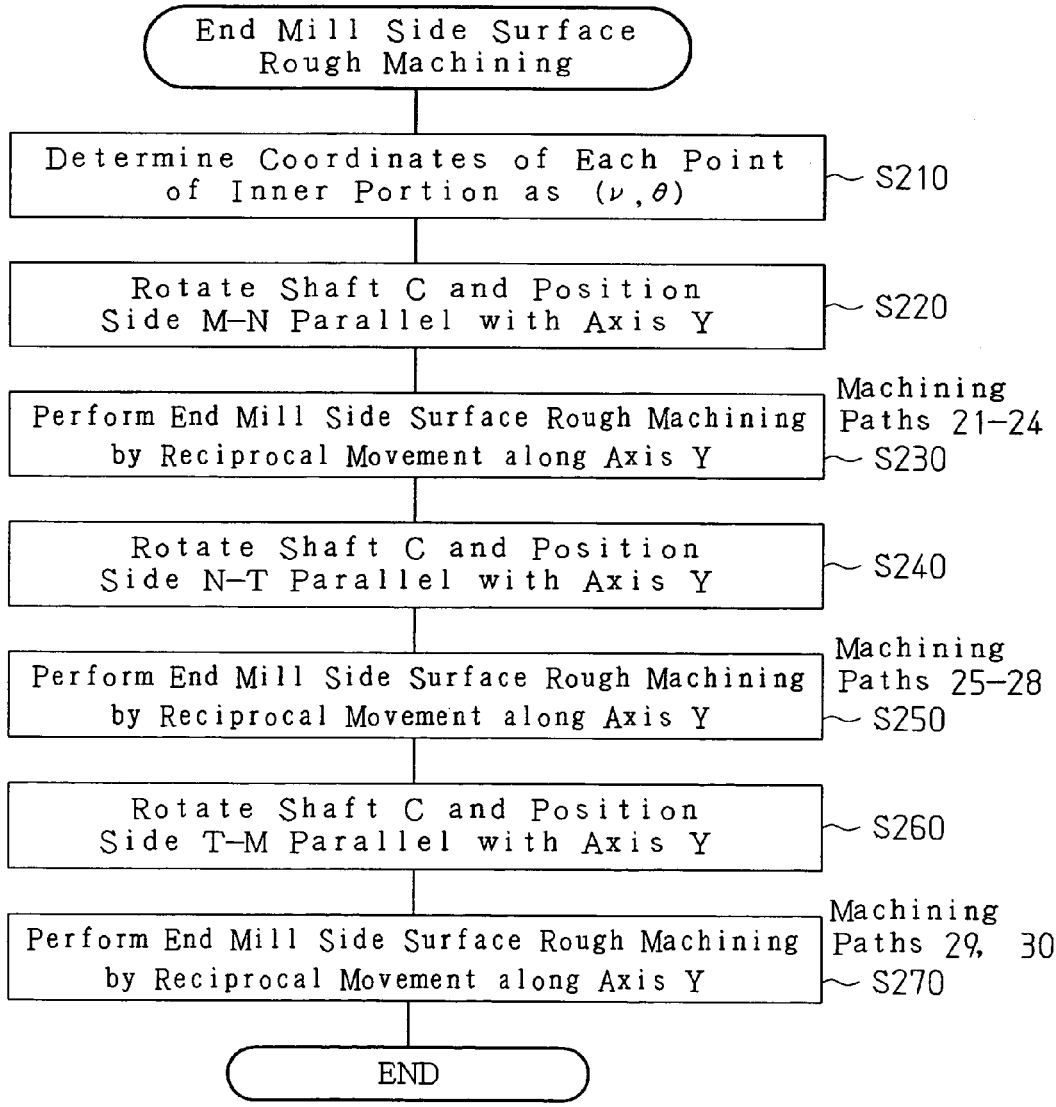
FIG. 15 is a view showing a data line of a shape sequence Ka displayed on the display of FIG. 1 in accordance with a second embodiment of the present invention.
FIG. 16 is a flowchart indicating an end mill side surface rough machining procedure according to the second embodiment.
Figure 17:
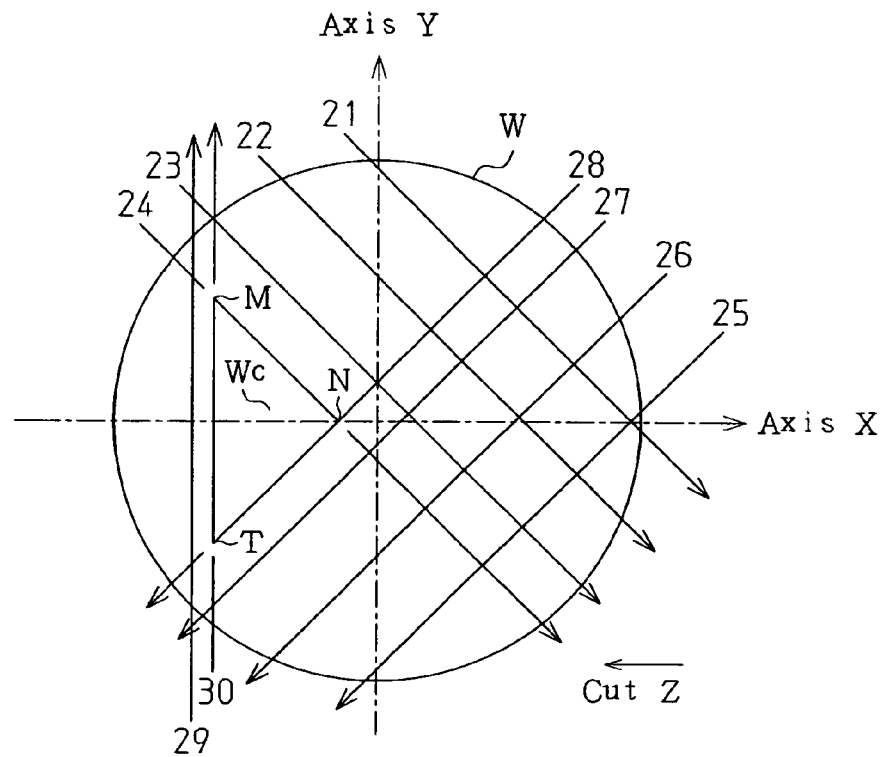
FIG. 17 is a view explaining a machining path of the machine tool of FIG. 2.

FIG. 15 is a view explaining data lines for the tool sequence K and those for the shape sequence Ka, which are displayed by the display 80. In the case illustrated in FIG. 15, the cross-sectional shape of the workpiece (machining object) W is circular and the cross-sectional shape of the portion Wc produced through cutting of the workpiece W is triangular, as shown in FIG. 17.

In the second embodiment, unlike the first embodiment, the main controller 20 operates the display 80 to display "FIG1" and "FIG2" instead of "FIG", as shown in FIG. 15. The data line numbered "1" and indicated below "FIG1" corresponds to the data line for the machining object. The data lines numbered "1" through "3" and indicated below "FIG2" correspond to the data lines for the cut object.

In the illustrated embodiment, the same data entry as that of the first embodiment is performed in terms of the data lines for the machining object. Regarding each of the items (1) to (3) of "FIG2", "straight line" is entered in correspondence with "PTN" and the coordinate values X and Y of each of the three points N, M, and T of the triangle shown in FIG. 17 with respect to the plane XY are entered in correspondence with "P1X/CX" and "P1Y/CY". When the "PTN" corresponds to "straight line", the codes ♦ are indicated in the spaces corresponding to "P3X/R" and "P3Y", as illustrated in FIG. 15.

As indicated by the flowchart of FIG. 3, the main controller 20 generates a machining program in step S50, based on the data entered in steps S20 to S40. The step S50 is identical to that of the first embodiment and the explanation thereof will be omitted.

In the second embodiment, the machining program generated by the device 10 is executed in accordance with the flowchart including steps S100A to S400A of FIG. 9. Since the machine tool S performing the machining program is configured identical to that of the first embodiment, the following description will not include the explanation thereof.

In the second embodiment, as shown in FIG. 17, paths numbered "21" through "30" are defined as the rough machining path and the finishing path. In FIG. 17, the section indicated by "Wc" corresponds to the portion resulting from cutting of the workpiece W.

According to the machining program executed by the main controller 20, the end mill side surface rough machining is performed in step S100A. FIG. 16 is a flowchart for carrying out the end mill side surface rough machining. In step S210, the main controller 20 obtains the coordinates of each of the points M, N, T of the cross-sectional shape of the portion Wc, which is formed through cutting of the portion to be machined of the workpiece W (the portion in which the restricting surfaces Wa, Wc are to be formed by machining: see FIG. 8), as the polar coordinates $(\gamma, \theta)$ in the coordinate system of the plane XY having the base point corresponding to the crossing point between the shaft C and the plane XY.

In the second embodiment, the cross-sectional shape of the cut resulting portion is triangular. The aforementioned coordinates of each point M, N, T correspond to the coordinates X, Y entered in correspondence with "P1X/CX" and "P1Y/CY" of the data lines for the shape sequence ka of the cut object.

Figure 18:
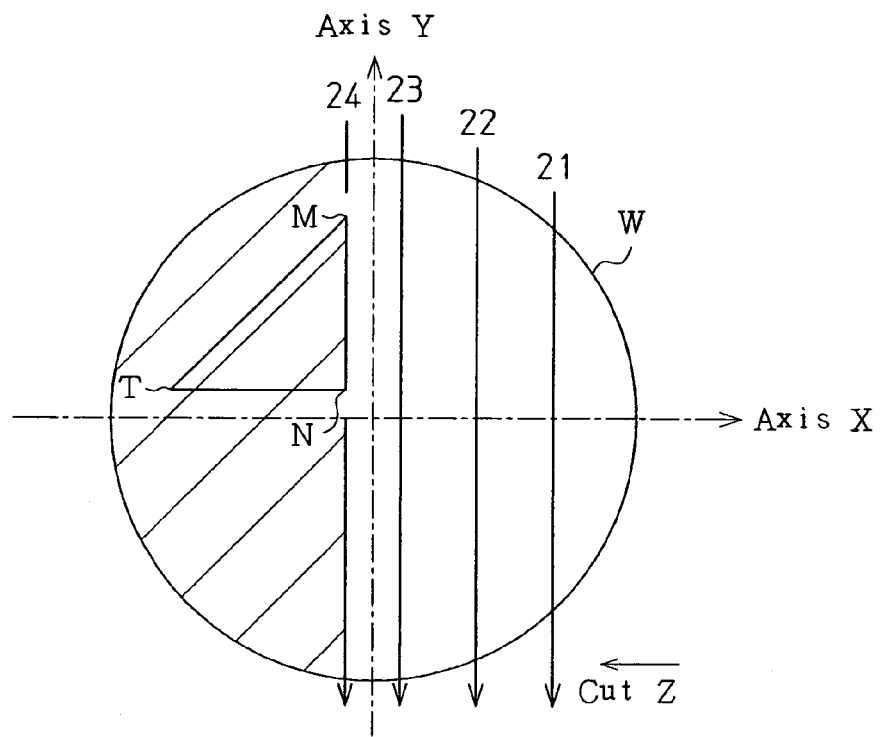
FIG. 18 is a view explaining machining of the workpiece W of FIG. 17.

In step S220, the main controller 20 enables the shaft C drive unit 112 to rotate the shaft C for positioning the workpiece W such that the side between the points M, N extends parallel with the axis Y (see FIG. 18). In step S230, in the state of FIG. 18, the main controller 20 enables the axes X-Y-Z drive unit 123 to reciprocally move the end mill 124 along the axis Y (along the machining paths 21 to 24 of FIG. 18). In this manner, rough machining is performed by the side surface of the end mill 124. More specifically, the main controller 20 continuously uses a certain one of the machining paths until the required cut dimension L (see FIG. 8) is covered by moving the end mill 124 by a pre-computed amount along the axis Z. After the cut dimension L is covered, the operation is switched to a subsequent machining path. For example, the main controller 20 performs rough machining along the machining path (21) and moves the end mill 124 along the axis Z. The end mill 124 is then operated along the machining path (21) for executing the rough machining. In this manner, the rough machining along the machining path (21) is continued until the cut dimension L is covered. The main controller 20 then switches to the subsequent machining path (22) and resumes the rough machining.

Figure 19:
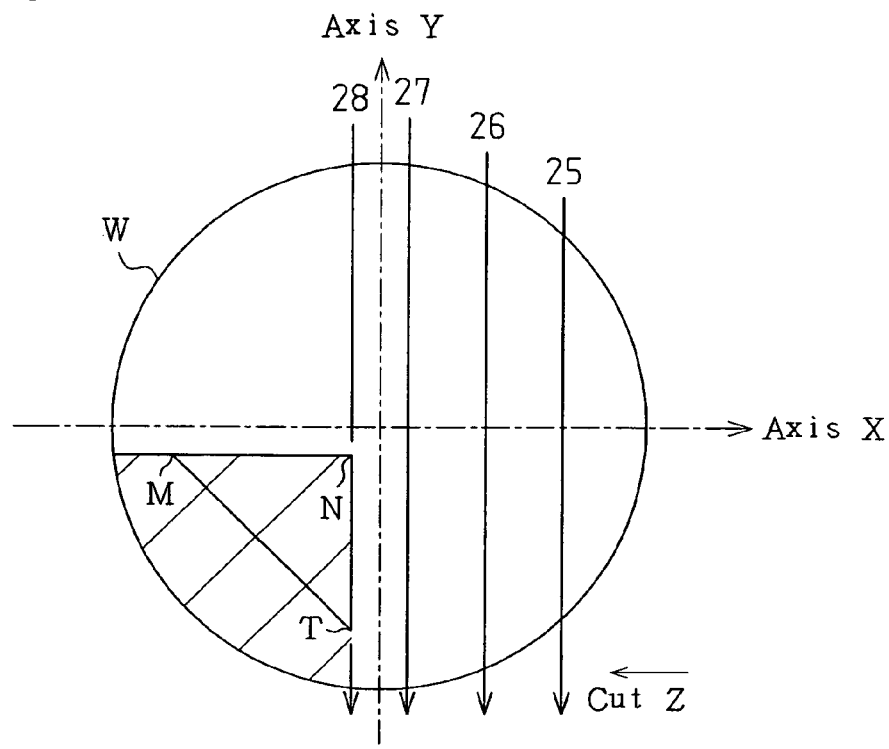
FIG. 19 is a view explaining machining of the workpiece W of FIG. 17.

Subsequently, in step S240, the main controller 20 rotates the shaft C drive unit 112 for positioning the workpiece W such that the side between the points N, T extends parallel with the axis Y (see FIG. 19). In step S250, in the state of FIG. 19, the main controller 20 enables the axes X-Y-Z drive unit 123 to reciprocally move the end mill 124 along the axis Y (along the machining paths 25 to 28 of FIG. 19). In this manner, the end mill 124 performs rough machining by the side surface of the end mill 124. Also in this case, the main controller 20 continuously uses a certain one of the machining paths 25 to 28 until the cut dimension L is covered in the same manner as step S230. When the cut dimension L is covered, the operation switches to a subsequent machining path.

Figure 20:
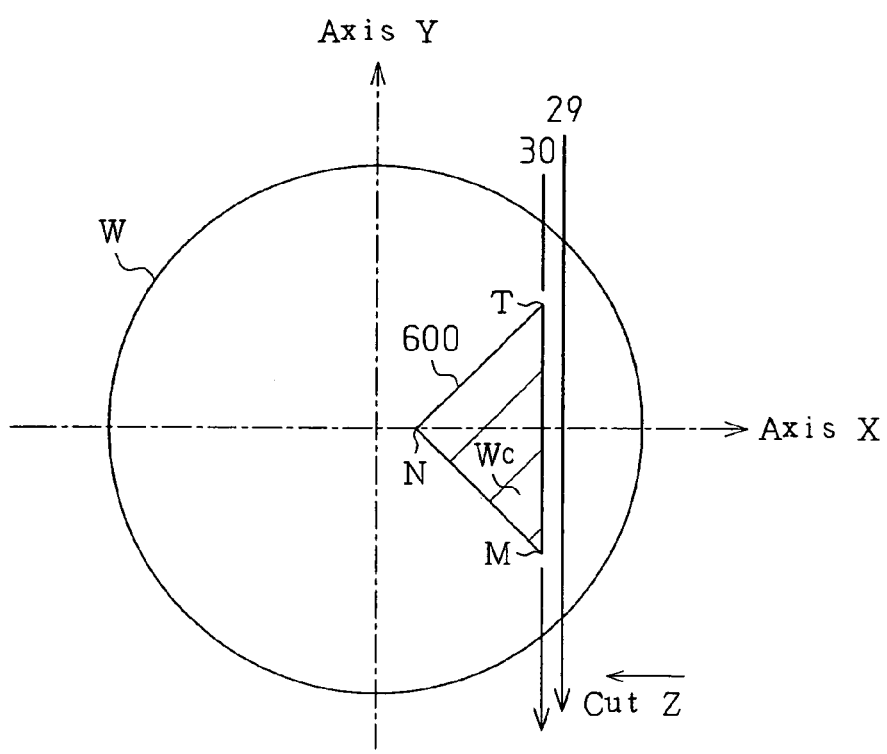
FIG. 20 is a view explaining machining of the workpiece W of FIG. 17.

In step S260, the main controller 20 rotates the shaft C drive unit 112 for positioning the workpiece W such that the side between the points T, M extends parallel with the axis Y (see FIG. 20). In step S270, in the state of FIG. 20, the main controller 20 enables the axes X-Y-Z drive unit 123 to reciprocally move the end mill 124 along the axis Y (along the machining paths 29, 30 of FIG. 20). In this manner, the rough machining is performed by the side surface of the end mill 124. Also in this case, the main controller 20 continuously uses a certain one of the machining paths until the cut dimension L is covered, in the same manner as step S230. When the cut dimension L is covered, the main controller 20 ends the step S270 and suspends the routine.

Next, in step 200A, the main controller 20 executes the end mill bottom surface rough machining. As shown in FIG. 20, three side surfaces are formed in the portion (hereinafter, referred to as "the shaft 600") resulting from cutting of the workpiece W and having a triangular cross-sectional shape. The three side surfaces of the shaft 600 are thus subjected to the rough machining by the end mill 124. In operation, the main controller 20 enables the shaft C drive unit 112 to position the shaft 600 in a switching manner such that each of the side between the points M, N, the side between the points N, T, and the side between the points T, M is, in this turn, located parallel with the axis Y.

Each time the shaft 600 is positioned, the main controller 20 rotates the end mill 124 with respect to the corresponding side surface of the shaft 600, such that the side surface of the shaft 600 is subjected to the rough machining by the side surface of the end mill 124.

In step S300A, the end mill 124 held by the tool holder 122 is replaced by a finishing tool at a non-illustrated tool replacement position. The finishing tool is then enabled to perform the end mill side surface finishing. More specifically, the main controller 20 operates the shaft C drive unit 112 such that the side between the points M, N, the side between the points N, T, and the side between the points T, M are located parallel with the axis Y, in this turn and in a switching manner, as shown in FIGS. 18 to 20. At each of the positions, the end mill side surface finishing is performed along the machining paths of FIG. 17.

Subsequently, in step S400A, the main controller 20 performs the end mill bottom surface finishing. As shown in FIG. 20, the three side surfaces are formed in the shaft 600. The three side surfaces of the shaft 600 are thus subjected to the finishing by the bottom surface of the end mill 124. More specifically, the main controller 20 operates the shaft C drive unit 112 to position the shaft 600 in a switching manner such that each of the side between the points M, N, the side between the points N, T, and the side between the points T, M is, in this turn, located parallel with the axis Y.

At each of the positions, the main controller 20 rotates the end mill 124 to subject the corresponding side surface of the shaft 600 to the finishing by the bottom surface of the end mill 124.

The invention may be embodied in the following forms.

The cross-sectional shape of the machining object is not restricted to the circular shape but may be defined as different shapes such as square or triangular or other polygonal shapes and other types of shapes than polygons.

The cross-sectional shape of the portion resulting from cutting of the workpiece W is not restricted to the circular shape but may be defined as different shapes such as polygonal shapes having four or more corners or other shapes than the circular and polygonal shapes.

The tool to be employed may be different tools other than the end mill.

The cutting condition basic information for generating the cutting conditions of the workpiece W may be inputted when or after the "depth" (the coordinate value along the axis Z) and "allowance R" (machining dimension) of the portion to be machined of the workpiece W are inputted.

The present examples and embodiments are to be considered as illustrative and not restrictive and the invention is not to be limited to the details given herein, but may be modified within the scope and equivalence of the appended claims.

The invention claimed is:

1. A method for generating a machining program for subjecting a machining object to machining such that the machining object obtains a final product shape, wherein the machining is classified into a plurality of machining modes in correspondence with the final product shape, each of the machining modes being divided into a plurality of machining units, a unit machining shape being formed in correspondence with each of the machining units, the final product shape being obtained by forming a plurality of unit machining shapes, an axis Z being defined in the machining object, the method comprising:

inputting a coordinate value and a machining dimension of a portion to be machined of the machining object with respect to the axis Z for forming a pair of restricting surfaces crossing the axis Z in the portion to be machined, wherein the pair of restricting surfaces hold the portion to be machined in between, and the machining dimension corresponds to the space between the pair of restricting surfaces;

determining the unit machining shape based on the inputted coordinate value and machining dimension;

determining a tool in accordance with the machining unit associated with the determined unit machining shape;

inputting data about a cross-sectional shape of the portion to be machined crossing the axis Z and data about a cross-sectional shape of a portion resulting from cutting of the portion to be machined, wherein the cross-sectional area of the cut resulting portion crossing the axis Z is smaller than the area of each of the restricting surfaces, wherein the cut resulting portion is eccentric in relation to the restricting surfaces;

generating a machining path in correspondence with the data about the cross-sectional shapes and the determined tool, wherein the machining path extends along a direction perpendicular to the axis Z, wherein the portion to be machined is rotated about the axis Z at an associated predetermined rotation angle, the machining path being defined for each rotation angle; and generating the machining program based on the generated machining path and the determined tool.

2. The method according to claim 1 further comprising:
storing a database of the machining path, wherein the database is predefined in correspondence with the data about the cross-sectional shape of the portion to be machined, the data about the cross-sectional shape of the cut resulting portion, and the determined tool; and
selecting the machining path from the database.

3. The method according to claim 1 further including:
pre-storing a cutting condition generation information;
inputting a cutting condition basic information; and
generating a cutting condition of the machining object based on the cutting condition basic information with reference to the cutting condition generation information, wherein the machining program is generated in correspondence with the generated cutting condition, the generated machining path, and the determined tool.

4. The method according to claim 3, wherein the cutting condition basic information is inputted prior to the input of the coordinate value and the machining dimension.

5. The method according to claim 3, wherein the cutting condition basic information includes the information about the material and dimensions of the machining object, and wherein the cutting condition generation information is a map prescribed for associating the material and dimensions of the machining object to the cutting condition.

6. The method according to claim 3, wherein the cutting condition includes at least one of a cut direction of the tool with respect to the machining object, a cut amount of the tool per cut, a circumferential speed of the tool, and a feed amount of the tool.

7. The method according to claim 1 further including:
inputting a cutting condition of the machining object after the input of the coordinate value and the machining dimension, wherein the machining program is generated in correspondence with the inputted cutting condition, the generated machining path, and the determined tool.

8. The method according to claim 1, wherein the machining path linearly extends along the direction perpendicular to the axis Z.

9. A device for generating a machining program for subjecting a machining object to machining such that the machining object obtains a final product shape, wherein the machining is classified into a plurality of machining modes in correspondence with the final product shape, each of the machining modes being divided into a plurality of machining units, a unit machining shape being formed by a tool in correspondence with each of the machining units, the final product shape being obtained by forming a plurality of unit machining shapes, the device comprising:

a numerical input portion for inputting a coordinate value and a machining dimension of a portion to be machined of the machining object with respect to an axis Z crossing a restricting surface for forming a pair of restricting surfaces in the portion to be machined, wherein the pair of restricting surfaces hold the portion to be machined in between, and the machining dimension corresponds to the space between the pair of restricting surfaces;

a tool determining portion for determining the unit machining shape based on the inputted coordinate value and the machining dimension and determining the tool in accordance with the machining unit associated with the determined unit machining shape;

a shape input portion for inputting data about a cross-sectional shape of the portion to be machined and data about a cross-sectional shape of a portion resulting from cutting of the portion to be machined, wherein the cross-sectional area of the cut resulting portion crossing the axis Z is smaller than the area of each of the restricting surfaces, wherein the cut resulting portion is eccentric in relation to the restricting surfaces; and a generating portion for generating a machining path in correspondence with the data about the cross-sectional shapes and the determined tool, wherein the machining path extends along a direction perpendicular to the axis Z, wherein the portion to be machined is rotated about the axis Z at an associated predetermined rotation angle, the machining path being defined for each rotation angle, wherein the machining program is generated based on the generated machining path and the determined tool.

10. The device according to claim 9 further comprising:
a memory for storing a database of the machining path, wherein the database is predefined in correspondence with the data about the cross-sectional shape of the portion to be machined, the data about the cross-sectional shape of the cut resulting portion, and the determined tool, wherein the machining path is selected from the database.

11. The device according to claim 9 further comprising:
a basic information input portion for inputting a cutting condition basic information; and
a cutting condition generating portion for generating a cutting condition of the machining object based on the cutting condition basic information with reference to a pre-stored cutting condition generation information, wherein the machining program is generated in correspondence with the generated cutting condition, the generated machining path, and the determined tool.

12. The device according to claim 11, wherein the basic information input portion is set to input the cutting condition basic information prior to the input of the coordinate value and the machining dimension.

13. The device according to claim 9 further including:
a cutting condition input portion for inputting a cutting condition of the machining object after the input of the coordinate value and the machining dimension, wherein the machining program is generated in correspondence with the inputted cutting condition, the generated machining path, and the determined tool.

14. A method for machining a portion to be machined held between a pair of restricting surfaces, thereby forming a portion that has a cross-sectional area smaller than each of the restricting surfaces and is eccentric in relation to the restricting surfaces, wherein an axis Z extending perpendicular to the restricting surfaces is defined in the portion to be machined, the method comprising:

inputting a coordinate value of the portion to be machined with respect to the axis Z, and a width of the space between the pair of the restricting surfaces;

determining a unit machining shape based on the inputted coordinate value and width;

determining a tool based on a machining unit related to the determined unit machining shape;

generating a machining path extending along a direction perpendicular to the axis Z based on data about a cross-sectional shape of the portion to be machined intersecting the axis Z, data about a cross-sectional shape of a portion resulting from cutting of the portion to be machined, and the determined tool, wherein the portion to be machined is rotated about the axis Z at an associated predetermined rotation angle, the machining path being defined for each rotation angle; and rotating the portion to be machined by the predetermined angle at a time to move the tool along the machining path for each rotation angle, thereby machining the portion to be machined.

* * * * *